UNITED STATES PATENT OFFICE.

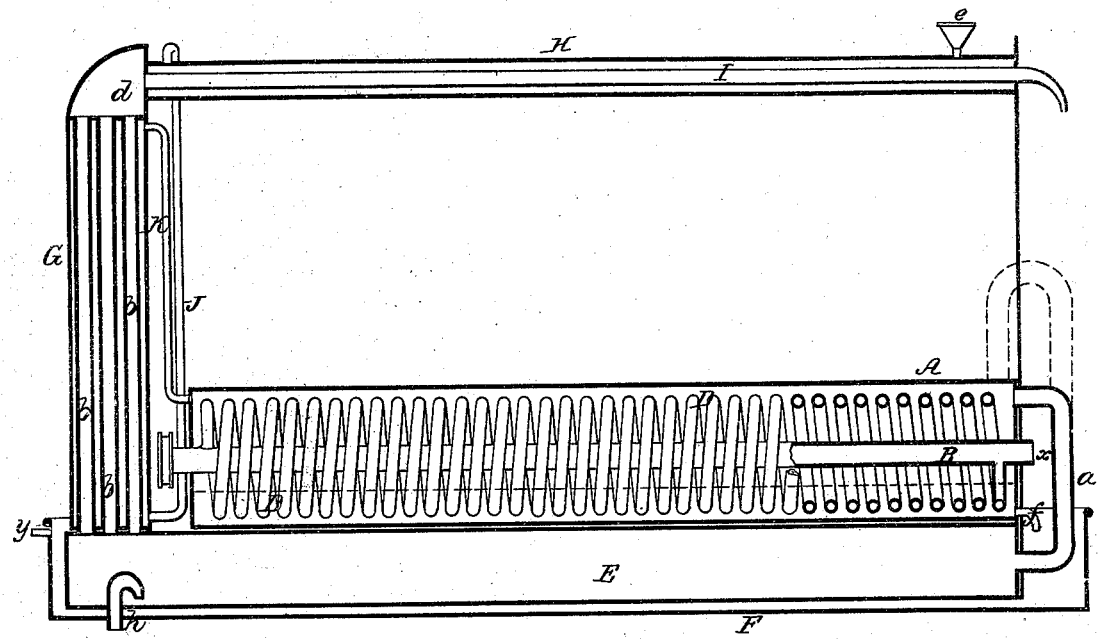
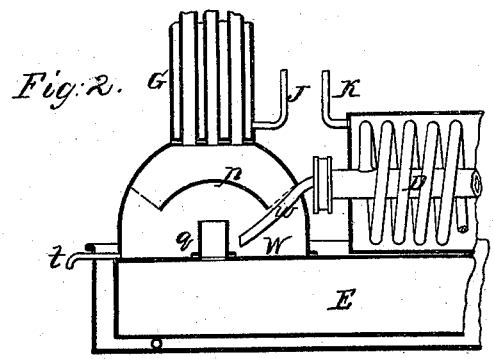

CHARLES H. BUDD, OF PHILADELPHIA, ASSIGNOR TO HIMSELF AND GEORGE D. WOLFF, OF NORRISTOWN, PENNSYLVANIA.

IMPROVED APPARATUS FOR CONTINUOUS DISTILLATION.

Specification forming part of Letters Patent No. 87,537, dated March 9, 1869; antedated February 26, 1869.

*To all whom it may concern:*

Be it known that I, CHARLES H. BUDD, of Philadelphia, Pennsylvania, have invented certain Improvements in Distillation; and I do hereby declare the following to be a full, clear, and exact description of the same.

My invention, which is fully described hereafter, has for its main objects a distillation by a continuous process, the utilizing of the spent wash or residuum of distillation, and the utilizing of the vapor by making it a medium for heating the wash prior to vaporizing the same.

In order to enable others skilled in the art to practice my invention, I will now proceed to describe a mode of carrying the same into effect, reference being had to the accompanying drawing, which forms a part of this specification, and in which—

Figure 1 is a sectional elevation of apparatus for carrying out my invention; Fig. 2, a section of a modification of part of the same.

On reference to Fig. 1, A represents a horizontal or nearly horizontal cylindrical casing, in the opposite ends of which turns a tube, B, and around the latter is a tubular coil, D, so secured to the tube B as to have a free communication at both ends and to revolve with the same. Below the cylindrical casing A is a reservoir, E, which is contained within a trough, F, or other suitable vessel.

There is a communication between the interior of the casing A and the reservoir E, at one end of the same, through a pipe, $a$, and at the opposite end of the reservoir is a vertical casing, G, containing a number of tubes, $b$, which form communications between the interior of the said reservoir E and a chamber, $d$, at the upper end of the said casing G. A pipe, H, extends from the chamber $d$ (without communicating therewith) to any desired point, the pipe being closed at its outer end, with the exception of an opening, through which projects the outer end of the internal tube I, the latter communicating at its opposite end with the interior of the chamber $d$.

There is, near the outer end of the pipe H, a funnel, $e$, communicating with the annular space between the said pipe H and internal tube I. There is also a tube, J, forming a communication between the pipe H, near the inner end of the same, and the interior of the casing G, near the lower end of the latter, and a pipe, $k$, forms a communication between the upper end of the said casing G and one end of the cylindrical casing A, at the outer end of which is a short pipe, $f$, for the discharge of the contents of the said casing into the trough F. The reservoir E is also furnished near one end with a discharge-cock, $h$, and the trough F with a discharge-pipe, $y'$.

Operation.

The wash for distillation is permitted to flow in a continuous stream through the funnel $e$ into the annular space between the external pipe, H, and internal tube, I, and thence through the pipe J to the interior of the casing G at the bottom of the same, the wash rising in the said casing until it reaches the pipe $k$ at the upper end of the same, through which pipe it passes into the cylindrical chamber A at a heat of about 170°, owing to the contact of the wash with the tubes $b$, through which the vapor passes, as explained hereafter.

It should be understood that a constant supply of live steam is permitted to pass into the tube B at $x$, thence through the tubular coil D, and out at the opposite end of the tube, so that the coil is maintained at an even temperature as it revolves.

The quantity of wash admitted to and the spent wash permitted to flow from the casing A are so regulated that the depth of the wash in the casing shall not exceed that indicated by the blue line, for it is important that the quantity of wash in this casing should be limited.

As the steam-heated coil revolves in the wash, a vapor is generated, which passes through the pipe $a$ (which may be bent upward and downward, as shown by dotted lines) into the reservoir E, the spent wash passing in a fluid but highly-heated state through the discharge-tube $f$ into the trough F.

Of the vapor which passes into the reservoir E, about fifty per cent. is spirit; but, as this reservoir is immersed in the highly-heated spent wash, it may be said to be subjected to a second distillation while it passes through this reservoir; hence it is deprived of the greater portion of its watery element before it reaches the vertical tube $b$, and this watery element passes off from the reservoir through the discharge-pipe $h$, which should be bent, as shown in the drawing, so as to form an automatic or periodic siphon, which insures a given depth of fluid in the reservoir. The vapor, in passing through the vertical tubes, is deprived of the remnant of its water. At the same time it imparts heat to the tubes $b$, and thence to the wash before the latter passes into the casing A. The vapor now deprived of its watery element reaches the chamber $d$, and passes thence through the tube I, where it is exposed to the cool wash passing through the annular space between the said tube and pipe I, from which it escapes in the form of alcohol.

It will now be seen that the process of distillation is continuous, the wash passing in an uninterrupted stream into the casing A, and the vapor passing continuously through the course pointed out, until it is converted into pure alcohol, while the spent wash flows constantly into the trough F, which is always full, as the discharge-pipe $y$ is situated near the upper edge of the trough at the end opposite to the point where the wash enters the same. Thus the spent wash, instead of being permitted to run to waste, is utilized by making it a medium for a second distillation of the vapor. The heat of the vapor, too, is utilized by raising the temperature of the wash before it enters the casing A.

In the modification shown in Fig. 2 there is a chamber, W, at the base of the casing G, and the vapor from the reservoir E enters this chamber through a short pipe, $q$, projecting into the same, there being above the pipe a diaphragm, $p$, which slightly impedes the upward progress of the vapor.

The result of this arrangement is the lodgment of dilute alcohol (which may be subjected to redistillation) in the chamber W, and its discharge therefrom through the pipe $t$.

In working this modified plan I permit the waste-steam from the pipe B to pass through a tube, $w$, into the chamber W, where the said steam tends to wash and rectify the dilute alcohol before it escapes from the said chamber.

I do not desire to confine myself to the specific apparatus herein described, as the same may be altered and modified without departing from the main features of my invention; but

I claim and desire to secure by Letters Patent—

1. The vaporizing of wash or other fluid by causing it to pass through a casing in which revolves a steam-heated coil or its equivalent, all substantially as herein set forth.

2. Causing the vapor of wash or other fluid to pass into and through a reservoir or casing immersed or partly immersed in the spent wash or residuum of distillation, all substantially as and for the purpose herein set forth.

3. Causing the vapor arising from distillation to pass through tubes in a casing or vessel, through which the wash passes prior to distillation, all substantially as and for the purpose specified.

4. The chamber W and its diaphragm $p$, arranged between the tubed casing G and reservoir E, substantially as set forth, for the purpose described.

5. The utilizing of the exhaust-steam by admitting it into the chamber W, where it rectifies the dilute alcohol, as set forth.

In testimony whereof I have signed my name to this specification in the presence of two subscribing witnesses.

CHAS. H. BUDD.

Witnesses:
  JOHN WHITE,
  H. SMITH.